(12) United States Patent  (10) Patent No.: US 9,377,929 B1
Shrivastava  (45) Date of Patent: Jun. 28, 2016

(54) TECHNIQUES FOR PRESENTING INFORMATION ON A GRAPHICAL USER INTERFACE

(71) Applicant: Symantec Corporation, Mountain View, CA (US)

(72) Inventor: Yogesh Shrivastava, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 276 days.

(21) Appl. No.: 14/138,939

(22) Filed: Dec. 23, 2013

(51) Int. Cl.
G06F 3/048 (2013.01)
G06F 3/0481 (2013.01)
G06F 3/0482 (2013.01)
G06F 3/0483 (2013.01)
G06F 3/0485 (2013.01)
G06F 17/30 (2006.01)

(52) U.S. Cl.
CPC .......... *G06F 3/04817* (2013.01); *G06F 3/0482* (2013.01); *G06F 3/0483* (2013.01); *G06F 3/0485* (2013.01); *G06F 17/30873* (2013.01)

(58) Field of Classification Search
CPC ................................................. G06F 17/30873
USPC .......................................................... 715/777
See application file for complete search history.

(56) References Cited

U.S. PATENT DOCUMENTS

| 8,924,869 | B2 * | 12/2014 | Fellman | G06F 9/4443 715/762 |
| 2002/0156829 | A1 * | 10/2002 | Yoshimine | G06F 17/3089 709/201 |
| 2007/0038934 | A1 * | 2/2007 | Fellman | G06F 9/4443 715/700 |
| 2010/0131856 | A1 * | 5/2010 | Kalbfleisch | G06F 17/30873 715/741 |
| 2011/0138295 | A1 * | 6/2011 | Momchilov | G06F 9/4445 715/740 |
| 2012/0173981 | A1 * | 7/2012 | Day | G06F 3/04817 715/719 |
| 2013/0061159 | A1 * | 3/2013 | Tseng | G06F 17/30873 715/760 |
| 2013/0212456 | A1 * | 8/2013 | Hyeon | G06F 17/2235 715/205 |
| 2013/0239049 | A1 * | 9/2013 | Perrodin | G06F 3/0481 715/800 |
| 2013/0332512 | A1 * | 12/2013 | Roman | G06F 3/0481 709/203 |
| 2014/0040742 | A1 * | 2/2014 | Park | G06F 3/0484 715/719 |
| 2014/0245229 | A1 * | 8/2014 | Jeon | G06F 3/04842 715/846 |

\* cited by examiner

*Primary Examiner* — William Titcomb

(74) *Attorney, Agent, or Firm* — Wilmer Cutler Pickering Hale and Dorr LLP

(57) ABSTRACT

Techniques for presenting information on a graphical user interface are disclosed. In one particular embodiment, the techniques may be realized as a method for presenting information on a graphical user interface including generating a first display for the graphical user interface, wherein the first display displays content of a web browser, displaying, on a display unit, the first display, determining whether an icon of the first display has been selected, generating a thumbnail based on content of the web browser when the icon has been selected, generating a new display for the graphical user interface comprising the thumbnail, and displaying, on the display unit, the new display.

18 Claims, 7 Drawing Sheets

TECHNIQUES FOR PRESENTING INFORMATION ON A GRAPHICAL USER INTERFACE

FIELD OF THE DISCLOSURE

The present disclosure relates generally to a graphical user interface and, more particularly, to techniques for presenting information on a graphical user interface.

BACKGROUND OF THE DISCLOSURE

Displaying information on a graphical user interface can often be challenging when a display screen size is limited. One example of a display with a limited screen size is a touchscreen on a device such as a smartphone. Because such a display is limited in the amount of content displayable at one time, it may be difficult for a user to efficiently utilize device resources and access content via the graphical user interface.

In view of the foregoing, it may be understood that there may be significant problems and shortcomings associated with traditional techniques for presenting information on a graphical user interface.

SUMMARY OF THE DISCLOSURE

Techniques for presenting information on a graphical user interface are disclosed. In one particular embodiment, the techniques may be realized as a method for displaying information on a graphical user interface comprising generating a first display for the graphical user interface, wherein the first display displays content of a web browser; displaying, on a display unit, the first display; determining whether an icon of the first display has been selected; generating a thumbnail based on content of the web browser when the icon has been selected; generating a new display for the graphical user interface comprising the thumbnail; and displaying, on the display unit, the new display.

In accordance with other aspects of this particular embodiment, the display unit is a touchscreen.

In accordance with other aspects of this particular embodiment, the touchscreen is provided in a mobile device.

In accordance with other aspects of this particular embodiment, the web browser is configured to access and display a plurality of webpages.

In accordance with additional aspects of this particular embodiment, the web browser comprises a selectable tab for each of the plurality of webpages.

In accordance with other aspects of this particular embodiment, a thumbnail for each of the plurality of webpages is generated.

In accordance with additional aspects of this particular embodiment, the icon indicates a number of the plurality of webpages.

In accordance with other aspects of this particular embodiment, the new display comprises a first predetermined region and a second predetermined region.

In accordance with other aspects of this particular embodiment, the first predetermined region comprises a portion of a webpage displayed via the web browser, the webpage being displayed in the first predetermined region with limited functionality.

In accordance with other aspects of this particular embodiment, the second predetermined region comprises the generated thumbnail.

In accordance with additional aspects of this particular embodiment, the web browser is configured to access a plurality of webpages and display one of the plurality of websites at one time, and wherein the second predetermined region comprises a thumbnail for each of the plurality of webpages.

In accordance with additional aspects of this particular embodiment, the thumbnails are scrollable.

In accordance with additional aspects of this particular embodiment, when one of the thumbnails is selected, the corresponding website is loaded and displayed in the web browser.

In accordance with other aspects of this particular embodiment, the second predetermined region comprises a selectable icon associated with each of the thumbnails and when the selectable icon is selected, the webpage corresponding to the thumbnail is terminated.

In accordance with other aspects of this particular embodiment, the second predetermined region comprises a second selectable icon indicating the number of webpages loaded in the web browser.

In accordance with additional aspects of this particular embodiment, the second predetermined region comprises a third selectable icon configured to create a new web browser tab for viewing another webpage when the third icon is selected.

In accordance with further aspects of this particular embodiment, the method further comprises determining a number of webpages loaded in the web browser; and generating a thumbnail for each of the webpages loaded in the web browser, wherein the new display comprises the thumbnail for each of the webpages.

In accordance with further aspects of this particular embodiment, the method further comprises determining whether one of the thumbnails has been selected; and displaying the website associated with the selected thumbnail, wherein the website is displayed in a fully functional format.

In another particular embodiment, the techniques may be realized as least one non-transitory processor readable storage medium storing a computer program of instructions configured to be readable by at least one processor for instructing the at least one processor to execute a computer process for performing the method comprising generating a first display for the graphical user interface, wherein the first display displays content of a web browser; displaying, on a display unit, the first display; determining whether an icon of the first display has been selected; generating a thumbnail based on content of the web browser when the icon has been selected; generating a new display for the graphical user interface comprising the thumbnail; and displaying, on the display unit, the new display.

In another particular embodiment, the techniques may be realized as a system for presenting information on a graphical user interface comprising one or more processors communicatively coupled to a network; wherein the one or more processors are configured to generate a first display for the graphical user interface, wherein the first display displays content of a web browser; display, on a display unit, the first display; determine whether an icon of the first display has been selected; generate a thumbnail based on the content of the web browser when it is determined that the icon has been selected; generate a new display for the graphical user interface comprising the thumbnail; and display, on the display unit, the new display.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION OF EMBODIMENTS

Figure 1:
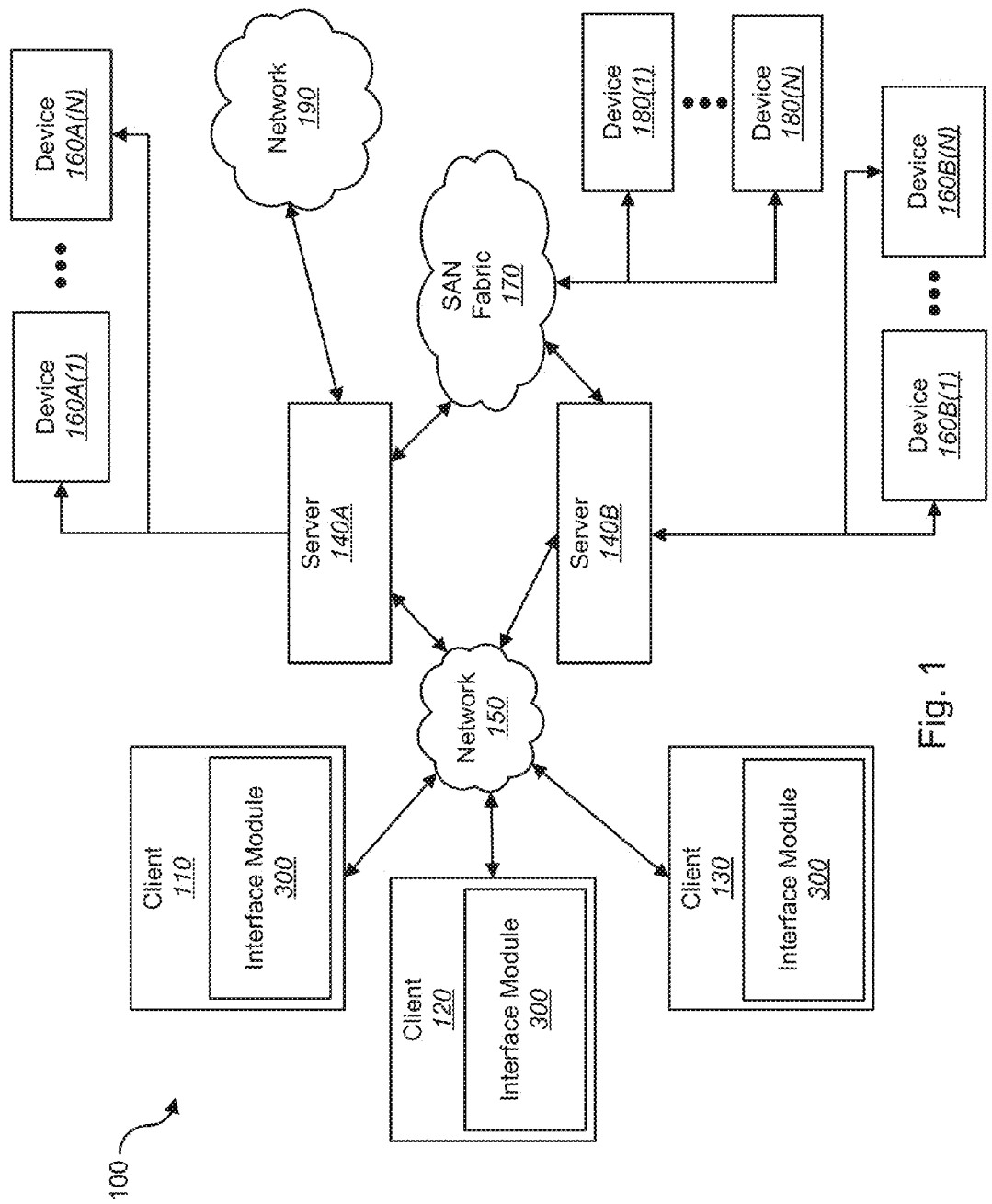
FIG. 1 shows a block diagram depicting a network architecture in accordance with an embodiment of the present disclosure.

FIG. 1 shows a block diagram depicting a network architecture 100 for presenting information on a graphical user interface in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of each of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Client systems 110, 120 and 130 may contain an interface module (e.g., interface module 300). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
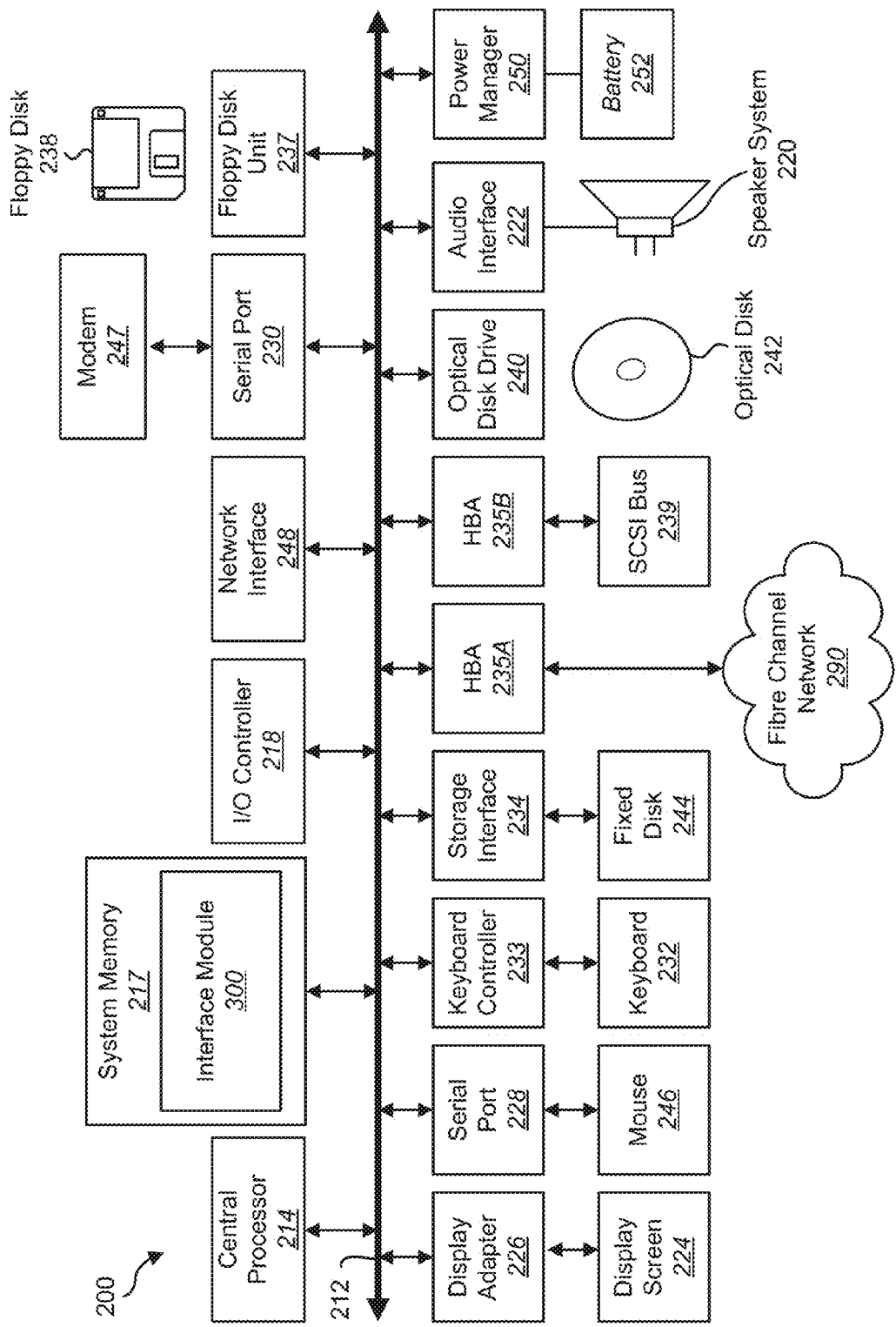
FIG. 2 shows a block diagram depicting a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may access information on servers 140A and 140B using, for example, a web browser or other client software (not shown). Such a client may allow client systems 110, 120 and 130 to access data hosted by any one of servers 140A and 140B or one of storage devices 160A(1)-(N), 160B(1)-(N), and/or 180(1)-(N). In some embodiments, client systems 110, 120 and 130 may access information on servers 140A and 140B using, for example, interface module 300.

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to any one of servers 140A and 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for storing web content such as for example, webpages.

According to some embodiments, clients 110, 120, and 130 may be smartphones, PDAs, desktop computers, laptop computers, servers, other computers or computing devices, or other devices coupled via a wireless or wired connection to network 150. Clients 110, 120, and 130 may receive data from user input, a database, a file, a web service, and/or an application programming interface. In some embodiments, clients 110, 120, and 130 may receive data from a user input via interface module 300.

Servers 140A and 140B may be application servers, web servers, archival platforms, backup servers, network storage devices, media servers, email servers, document management platforms, enterprise search servers, anti-malware/virus security servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. Servers 140A and 140B may also be hosts, such as web servers, to provide web content to clients.

According to some embodiments, servers 140A and 140B may be platforms used for backing up and/or store internet content. One or more portions of the content may be stored and formatted in accordance with a known protocol (e.g., JavaScript, Flash, etc.).

According to some embodiments, clients 110, 120, and 130 may contain one or more portions of software for accessing content via a graphical user interface such as, for example, interface module 300. As illustrated, one or more portions of the interface module 300 may reside at a network centric location. According to some embodiments, network 190 may be an external network (e.g., the Internet) and server 140A may be a gateway or firewall between one or more internal components and clients and the external network. According to some embodiments, the interface module 300 may be implemented as part of a cloud computing environment.

FIG. 2 shows a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g., RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, a removable disk unit (e.g., Universal Serial Bus drive), or other storage medium. According to some embodiments, the interface module 300 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
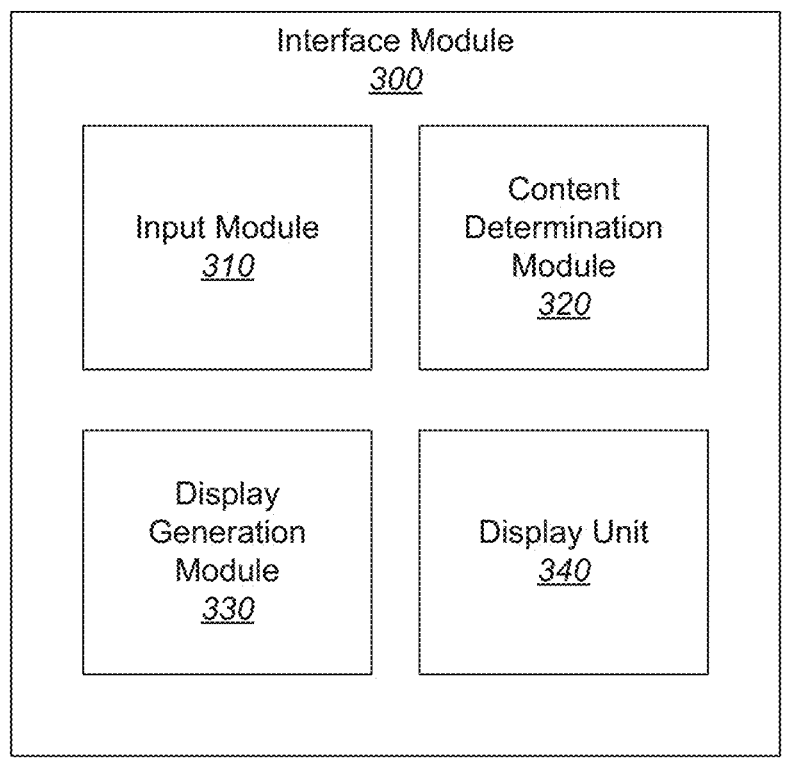
FIG. 3 shows an interface module in accordance with an embodiment of the present disclosure.

FIG. 3 shows an interface module 300 in accordance with an embodiment of the present disclosure. As illustrated, the interface module 300 may contain one or more components including an input module 310, a content determination module 320, a display generation module 330, and a display unit 340.

The input module 310 may receive an input from a user. In some instances, the input may be received from a user via a I/O device such as a keyboard and/or mouse. In other instances, the input may be received from a user via a touchscreen (e.g., capacitive touchscreen).

The content determination module 320 may determine content currently displayed via the graphical user interface ("GUI") on display unit 340. In some instance, the content determination module 320 may determine whether the GUI is displaying a web browser. The determination module 320 may also determine a number of webpage loaded by the web browser. For instance, a user may load multiple webpage which are viewable by selecting associated tabs or windows within a single web browser. In some embodiments, a device implementing the interface module 300 may execute multiple web browsers. In those instances, the content determination module 320 may determine the content contained within each of the web browsers.

The display generation module 320 may generate a display of content to be viewed by a user via the GUI displayed on display unit 340. In some embodiments, the content is a webpage displayed via a web browser. The web browser may display multiple webpage in separate tabs or multiple browser windows. In some instances, the display generation module 320 may display a web browser on the GUI having a selectable icon arranged near a uniform resource locator ("URL") address bar. This icon may be selected by a user to cause a different display to be generated and viewable on the GUI. Additionally, the icon may indicate a number of webpage loaded and displayable by selecting the various associated tabs or browser windows. In some embodiments, the number of number of webpage loaded and displayable is determined by the content determination module 320.

Upon selection of the icon, the display generation module 320 may generate a new interface displayable on the GUI. The display generation module 320 may also generate a thumbnail for each of the webpage loaded. The new interface may display the thumbnails of the loaded and displayed webpage next to the currently loaded webpage (e.g., on a right side of the new interface). In some instances, a segment of the currently loaded webpage may displayed on a first portion of the interface while the thumbnails are displayed on a second portion of the interface. In some embodiments, the thumbnails are arranged in the second portion of the interface in a vertical manner and scrollable by a user. Additional details regarding the new interface generated by the display generation module 320 are described below with respect to FIG. 7.

The display unit 340 may display any content identified by the content determination module 320 and any interface or display generated by the display generation module 330. The display unit 340 may also display any other content or data on the device such as for example, data generated by another application or program. In some embodiments, the display unit 340 is a touchscreen that may receive a user input. The display unit 340 may also provide a user or with an interface to control any aspect to the processes described below.

Figure 4:
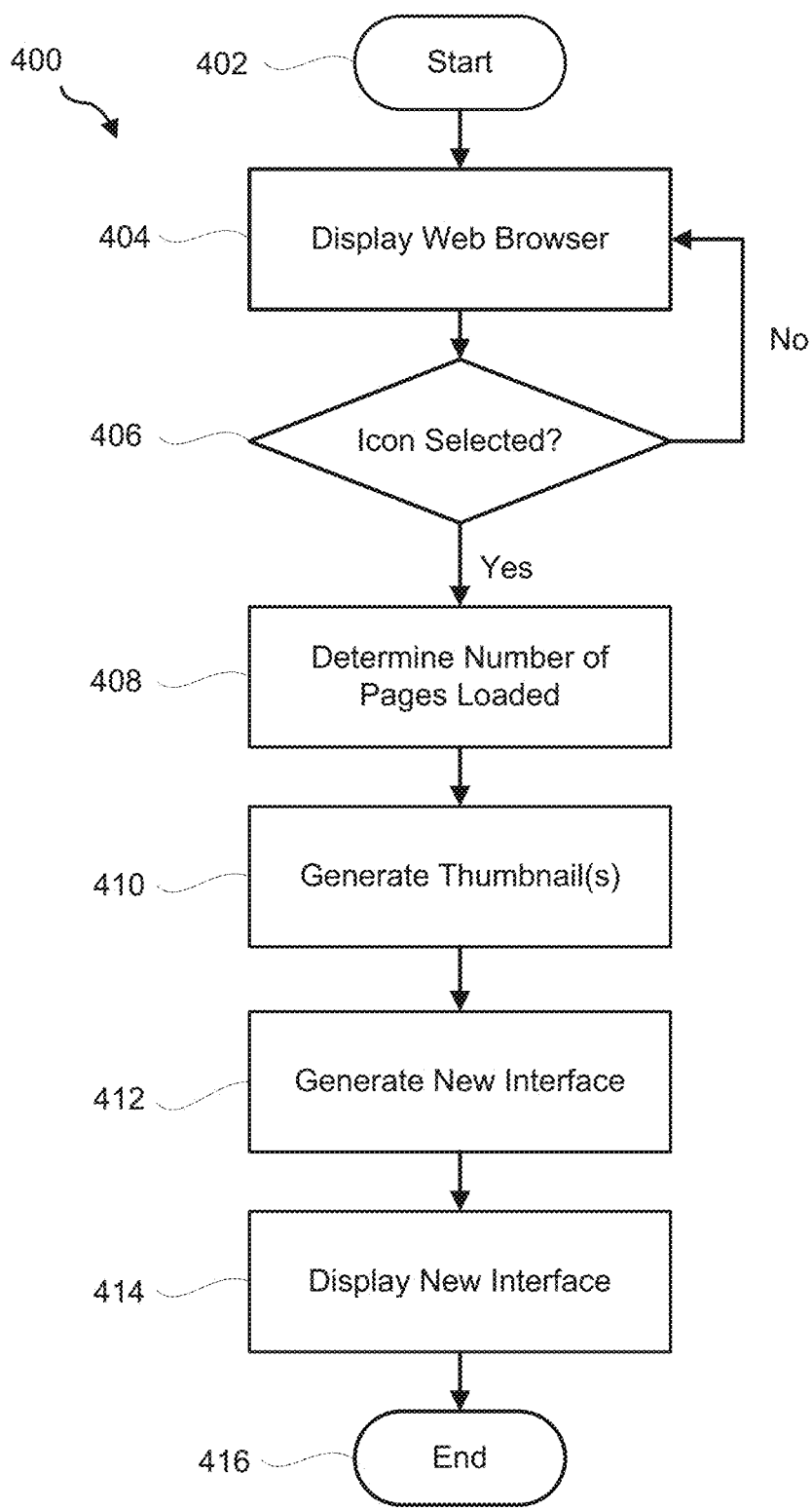
FIG. 4 shows a method for displaying content on a graphical user interface in accordance with an embodiment of the present disclosure.

FIG. 4 shows a method 400 implementing a graphical user interface in accordance with an embodiment of the present disclosure. The method 400 may be performed on any one of clients 110, 120, and 130 at any time. At block 402, the method 400 may begin.

At block 404, a web browser may be displayed. In some embodiments, a display of the web browser may be generated by the display generation module 330 and viewable by a user via a GUI displayed on the display unit 340. In some instances, the web browser is an application or program executed on a mobile device. Within the web browser, at least one webpage may be viewed. In some embodiments, multiple webpage may be arranged in various tabs or windows. The web browser may also display other content (e.g., bookmarks, settings, etc.).

Figure 6:
FIG. 6 shows a graphical user interface in accordance with an embodiment of the present disclosure.

In some embodiments, a selectable icon may be displayed with the web browser. In at least one instance, the selectable icon is displayed near a toolbar or URL address bar in the web browser. The selectable icon may indicate a number of webpages currently loaded and viewable in the various tabs or windows. One example of the web browser displayed at block 404 is shown in FIG. 6 and described below. After the web browser has been displayed, the overall process may then proceed to block 406.

At block 406, it may be determined whether the icon has been selected. In some embodiments, the determination of whether the icon has been selected may be performed by the input determination module 310. In at least one embodiment, a user may select the icon via an I/O device such as a keyboard or a mouse. In some instances, the web browser is displayed on a mobile device such as a smartphone and a user may select the icon via a touchscreen using their finger or a stylus. When it is determined that the icon has not been selected, the process may proceed back to block 404. However, when it is determined that the icon has been selected, the overall process may proceed to block 408.

At block 408, the number of webpages loaded and viewable via the web browser may be determined. In some embodiments, the number of webpages loaded may be determined by the content determination module 320. In some instances, only one webpage may be loaded and currently displayed via the web browser. In other instances, a plurality of webpages may be loaded and viewable via the web browser by selecting associated tabs or windows. In some embodiments, the web browser may be configured to display content of one webpage while displaying selectable tabs associated with other webpages. Upon selection of a different tab or window, the content of that webpage may be loaded and displayed. After the number of webpages loaded has been determined, the overall process may proceed to block 410.

At block 410, a thumbnail for each webpage determined to be loaded at block 408 may be generated. In some embodiments, the display generation module 330 may generate the thumbnails of the webpages. The thumbnails may be of a predetermined size and in some instances may be a screenshot or capture of the webpage as displayed. After a thumbnail for each webpage has been generated, the overall process may proceed to block 412.

Figure 7:
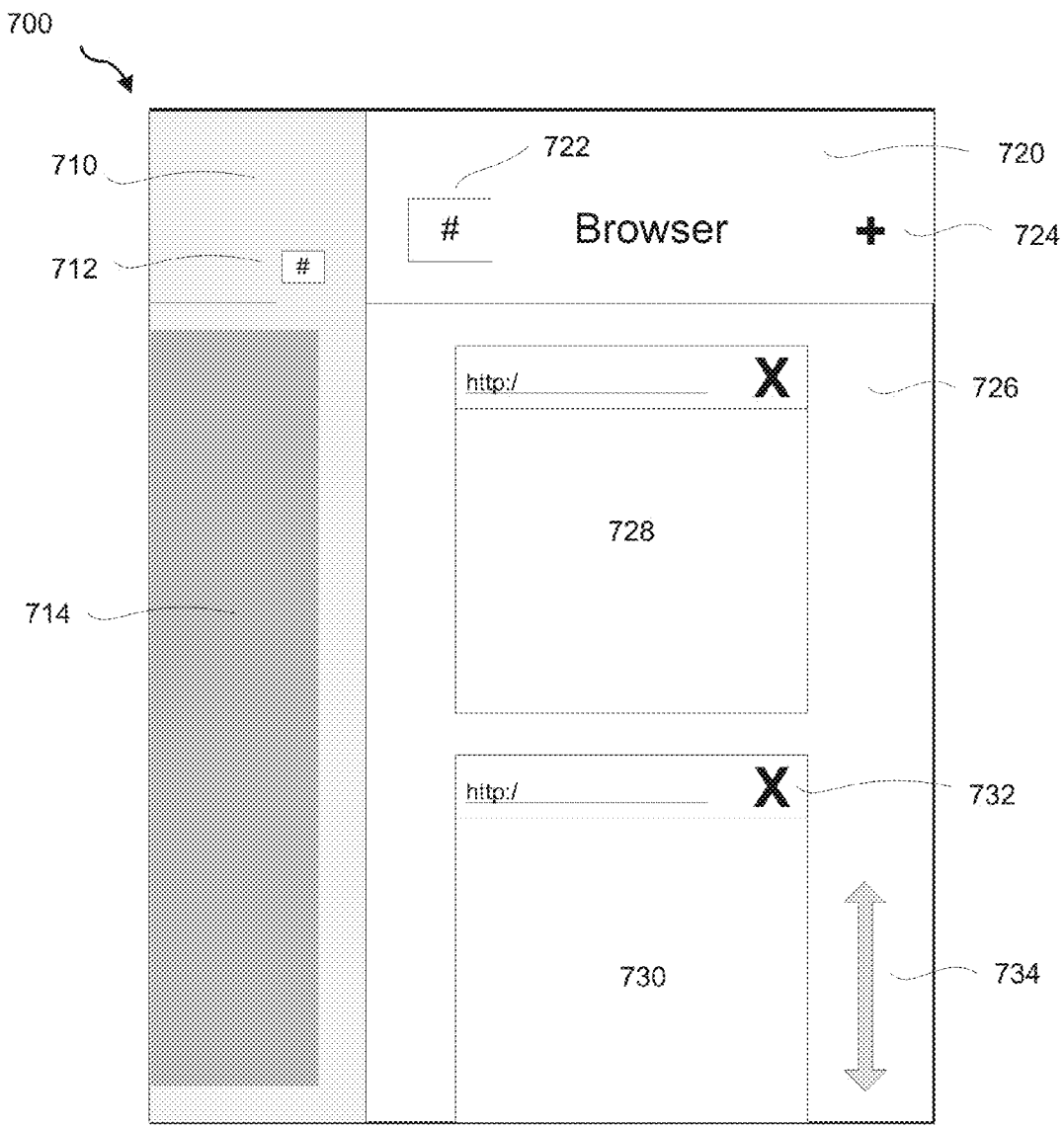
FIG. 7 shows a graphical user interface in accordance with an embodiment of the present disclosure.

At block 412, a new interface may be generated. In some embodiments, the new interface may be generated by the display generation module 330. The new interface may display the web browser in a different format than the web browser displaying a single webpage with selectable tabs associated with other webpages. One example of the new interface is shown in FIG. 7 and described below. In some instances, the new interface comprises first region and a second region. In the first region, a portion of the webpage being displayed at block 404 may be provided. In at least one embodiment, the portion of the webpage being displayed in the first region may be displayed in a different format than as displayed in block 404. For example, at block 404 the webpage is displayed in a fully interactive manner such that a user can view and access any content within the webpage. In contrast, the portion of the webpage displayed in the first region of the new interface may be viewable but have limited or no functionality (e.g., links disabled, etc.). In some embodiments, a user may select the portion of the webpage displayed and return to the webpage as displayed in block 404.

In the second region, a toolbar and the thumbnails generated at block 410 may be displayed. In some embodiments, the thumbnails may be displayed in a manner such that a user may scroll vertically through the thumbnails. In additional embodiments, the portion of the webpage displayed in the first region may be updated to correspond to a thumbnail centrally displayed in the second region. For instance, when a user scrolls through the thumbnails of the webpages, the first region may be updated to display a segment of a webpage corresponding to one of the thumbnails displayed in a central location of the second region.

In some instances, a user may also close or terminate a loaded webpage by selecting an icon associated with the thumbnails. For example, each thumbnail may be displayed with a corresponding icon to close the tab or window associated with that webpage. Additionally, a user may open a new tab or window within the browser by selecting another icon in the toolbar of the second region. Further, the second region may include a selectable icon similar to the selectable icon described above with respect to block 406. This selectable icon of the second region may indicate the number of pages loaded determined at block 408. When a user selects this icon in the second region, the web browser may be displayed similar to block 404. Further, a user may select a thumbnail of a webpage displayed in the second region as described below with respect to FIG. 5. The overall process 400 may periodically or continuously.

Figure 5:
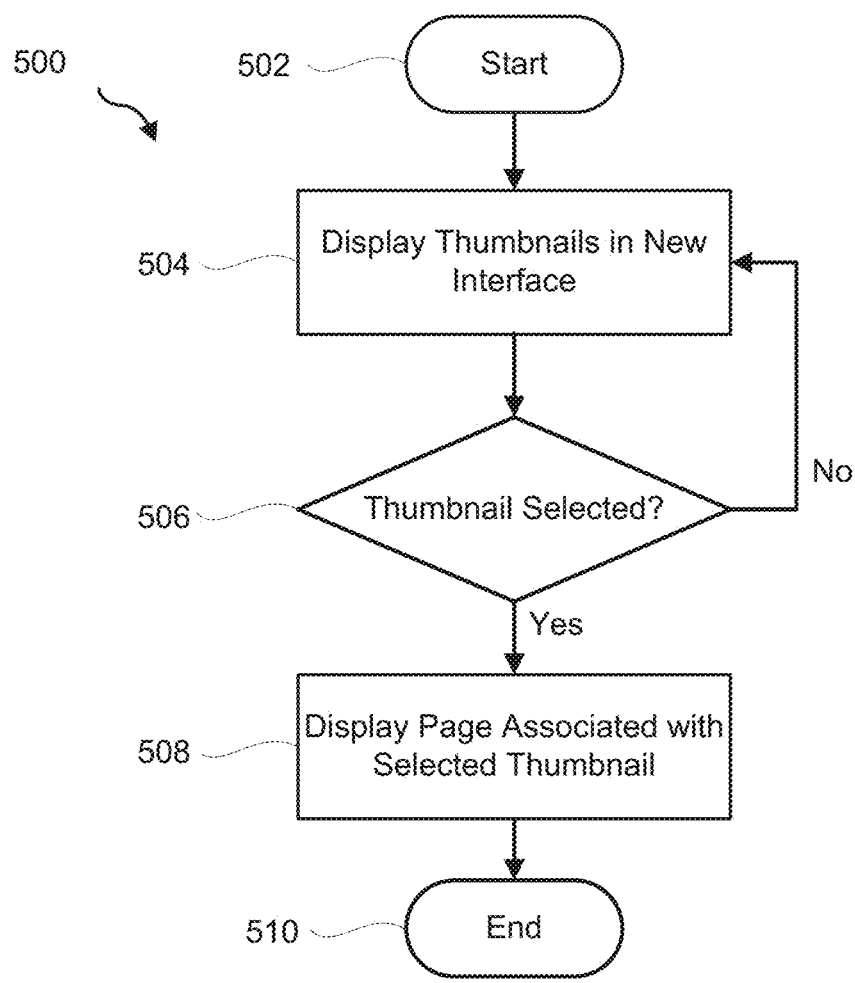
FIG. 5 shows a method for displaying content on a graphical user interface in accordance with an embodiment of the present disclosure.

FIG. 5 shows a method 500 for implementing a graphical user interface in accordance with an embodiment of the present disclosure. The method 500 may be performed on any one of clients 110, 120, and 130. At block 502, the method 500 may begin.

At block 504, the new interface having the generated thumbnails may be displayed. In some embodiments, the new interface may be displayed by the display unit 340. The new interface may be displayed in accordance with the description above with respect to block 414. After the new interface having the thumbnails has been displayed, the overall process may proceed to block 506.

At block 506, it may be determined whether a thumbnail displayed in the second region of the interface has been selected. In some embodiments, the determination of whether the thumbnail has been selected may be performed by the input determination module 310. As noted above, the thumbnails displayed in the second region may be scrollable such that a user may select any one of the thumbnails. If it is determined that a thumbnail has not been selected, the overall process may proceed back to block 504. However, upon a determination that a thumbnail has been selected, the overall process may proceed to block 508.

At block 508, the webpage associated with that selected thumbnail may be displayed in a fully functional format while the second region may be no longer displayed. In some embodiments, the webpage may be displayed by the display unit 340. In at least one embodiment, the webpage associated with the selected thumbnail may be displayed similar to the webpage display discussed above with respect to block 404 and as shown in FIG. 6. The overall process 500 may repeat periodically or continuously.

FIG. 6 shows a graphical user interface 600 in accordance with an embodiment of the present disclosure. In some embodiments, the graphical user interface 600 may display a web browser via display unit 340. The web browser may provide an address bar 602 to input a URL or webpage address. The web browser may also provide selectable tabs 608 near the address bar 602. Each tab 608 may be associated with a different webpage such that when a user selects a tab, the associated webpage content may be displayed in region 604 and the webpage address may be displayed in address bar 602.

The web browser may display content of a webpage in region 604. For instance, the web browser may display text, images, video, etc. in region 604. The region 604 may also display any other relevant data associated with the web browser such as bookmarks, settings, etc. In addition to the address bar 602 and the webpage content 604, the web browser may also provide a selectable icon 606.

The selectable icon 606 may indicate a number of webpages loaded and viewable by selecting different tabs or windows. For instance, when four tabs each having a webpage loaded are open, the selectable icon 606 may display the number four. The number indicated in the selectable icon 606 may be updated when a user closes a webpage or opens a new webpage. A user may select the icon 606 at any time. When the icon 606 is selected, the GUI shown in FIG. 7 may be displayed. In some embodiments, the device may transition from the GUI of FIG. 6 to the GUI of FIG. 7 by simulating that the web browser is sliding to create a new region to display the browser thumbnails. For instance, the web browser may appear as if it is sliding from the right to the left to create additional space.

FIG. 7 shows a graphical user interface 700 in accordance with an embodiment of the present disclosure. In some embodiments, the graphical user interface 700 may be displayed by display unit 340. The GUI 700 may comprise two regions: a first region 710 and a second region 720. The first region 710 may display a segment 714 of the content being displayed in region 604 of FIG. 6 when the icon 606 is selected. For example, the region 604 may be displaying a webpage when icon 606 is selected. Accordingly, a segment 714 of that content in region 604 may be displayed in the first region 710.

In at least one embodiment, the segment 714 of the content being displayed in the first region 710 may be displayed in a different format than as displayed in FIG. 6. For example, in FIG. 6, the content 604 may be displayed in a fully interactive manner such that a user can view, access, or interact with the content. However, the segment 714 of the content displayed in the first region 710 may have limited or no functionality. For instance, the content in region 714 may be greyed out such that a user cannot access additional content (e.g., links) embedded in the webpage. The first region 710 may also display an icon 712 corresponding to the selectable icon 606. In some embodiments, when a user selects any portion of the first region 710, the display will transition back to the web browser as shown in FIG. 6

The second region 720 may comprise two areas: first area 720 and second area 726. First area 720 may include an icon 722 similar to the selectable icon 606 shown in FIG. 6. Icon 722 may display the number of webpages loaded and viewable, similar to icon 606. For instance, when four webpages are currently loaded, icon 722 may display the number four (4). Icon 722 may be updated to reflect newly opened or closed webpages. Additionally, icon 722 may be selectable such that when a user selects icon 722, the GUI 600 may be displayed. In addition to the icon 722, the first area 720 may include another icon 724. Icon 724 may be selectable such that when a user selects icon 724, a new tab or window may be created in the web browser and a new thumbnail may be generated and placed in the second region 726.

Second area 726 may display thumbnails of the webpages currently loaded and viewable by selecting the various tabs or windows. In at least one example, the web browser may have two webpages loaded and associated with two tabs. When the icon 606 is selected, thumbnails 728/730 of each webpage may be displayed. Each thumbnail may be displayed with an associated icon 732. When the icon 732 is selected by a user, the thumbnail 730 may be removed from the second area 726 and the associated webpage loaded in the browser may be closed.

The thumbnails may be displayed such that a user may scroll vertically through the thumbnails 728/730. For instance, the web browser may have four webpages loaded and associated with four tabs. In this instance, a user may view the first thumbnails 728/730 upon selection of the icon 606. However, a user may scroll through the thumbnails such that thumbnails for the remaining webpages may be displayed. Arrow 734 indicates a direction of movement for the thumbnails. In an alternative embodiment, the thumbnails may be displayed horizontally such that a user can scroll through the thumbnails in a horizontal manner. This scrolling functionality allows a user to quickly recognize each webpage that is open and the content of each webpage without being required to select and load each independent webpage. Additionally, the icons 606 and 722 allow a user to quickly move back and forth between GUI 600 and GUI 700. This is especially advantageous for a mobile user operating a smartphone with one hand via a touchscreen interface. Also, a user may intuitively move back to GUI 600 from GUI 700 be selecting the portion of the segment 714 of the content displayed in the first region 710.

At this point it should be noted that presenting information on a graphical user interface in accordance with the present disclosure as described above may involve the processing of input data and the generation of output data to some extent. This input data processing and output data generation may be implemented in hardware or software. For example, specific electronic components may be employed in the presentation of information on a graphical user interface or similar or related circuitry for implementing the functions associated with presenting information on a graphical user interface in accordance with the present disclosure as described above. Alternatively, one or more processors operating in accordance with instructions may implement the functions associated with presenting information on a graphical user interface in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for presenting information on a graphical user interface comprising:
   generating a first display for the graphical user interface, wherein the first display displays content of a web browser;
   displaying, on a display unit, the first display;
   determining whether an icon of the first display has been selected;
   generating a thumbnail based on content of the web browser when the icon has been selected;
   generating a new display for the graphical user interface comprising the thumbnail; and
   displaying, on the display unit, the new display,
   wherein the new display comprises a first predetermined region corresponding to the portion of the new display and a second predetermined region, and
   wherein the first predetermined region comprises a portion of a webpage displayed via the web browser, the webpage being displayed in the first predetermined region with limited functionality.

2. The method of claim 1, wherein the display unit is a touchscreen.

3. The method of claim 2, wherein the touchscreen is provided in a mobile device.

4. The method of claim 1, wherein the web browser is configured to access and display a plurality of webpages.

5. The method of claim 4, wherein the web browser comprises a selectable tab for each of the plurality of webpages.

6. The method of claim 5, wherein a thumbnail for each of the plurality of webpages is generated.

7. The method of claim 6, wherein the icon indicates a number of the plurality of webpages.

8. The method of claim 1, wherein the second predetermined region comprises the generated thumbnail.

9. The method of claim 1, wherein the web browser is configured to access a plurality of webpages and display one of the plurality of websites at one time, and wherein the second predetermined region comprises a thumbnail for each of the plurality of webpages.

10. The method of claim 9, wherein the thumbnails are scrollable.

11. The method of claim 10, wherein when one of the thumbnails is selected, the corresponding website is loaded and displayed in the web browser.

12. The method of claim 9, wherein the second predetermined region comprises a selectable icon associated with each of the thumbnails and when the selectable icon is selected, the webpage corresponding to the thumbnail is terminated.

13. The method of claim 9, wherein the second predetermined region comprises a second selectable icon indicating the number of webpages loaded in the web browser.

14. The method of claim 9, wherein the second predetermined region comprises a third selectable icon configured to create a new web browser tab for viewing another webpage when the third icon is selected.

15. The method of claim 1, further comprising:
   determining a number of webpages loaded in the web browser; and
   generating a thumbnail for each of the webpages loaded in the web browser, wherein the new display comprises the thumbnail for each of the webpages.

16. The method of claim 15, further comprising:
   determining whether one of the thumbnails has been selected; and
   displaying the website associated with the selected thumbnail, wherein the website is displayed in a fully functional format.

17. At least one non-transitory processor readable storage medium storing a computer program of instructions configured to be readable by at least one processor for instructing the at least one processor to execute a computer process for performing the method as recited in claim 1.

18. A system for presenting information on a graphical user interface comprising:
   one or more processors communicatively coupled to a network; wherein the one or more processors are configured to:
      generate a first display for the graphical user interface, wherein the first display displays content of a web browser;
      display, on a display unit, the first display;
      determine whether an icon of the first display has been selected;
      generate a thumbnail based on the content of the web browser when it is determined that the icon has been selected;
      generate a new display for the graphical user interface comprising the thumbnail; and
      display, on the display unit, the new display,
      wherein the new display comprises a first predetermined region corresponding to the portion of the new display and a second predetermined region, and
      wherein the first predetermined region comprises a portion of a webpage displayed via the web browser, the webpage being displayed in the first predetermined region with limited functionality.

* * * * *